United States Patent
Velez, Jr.

(10) Patent No.: US 7,753,061 B2
(45) Date of Patent: Jul. 13, 2010

(54) HIGH PRESSURE INTERNAL CLEANING METHOD AND APPARATUS

(75) Inventor: Ramon M. Velez, Jr., Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 6 days.

(21) Appl. No.: 12/145,835

(22) Filed: Jun. 25, 2008

(65) Prior Publication Data

US 2008/0289666 A1    Nov. 27, 2008

Related U.S. Application Data

(62) Division of application No. 10/747,720, filed on Dec. 29, 2003, now Pat. No. 7,406,971.

(51) Int. Cl.
    *B08B 3/02* (2006.01)

(52) U.S. Cl. ..................................... 134/171

(58) Field of Classification Search .................. 134/171
    See application file for complete search history.

(56) References Cited

U.S. PATENT DOCUMENTS

| 1,492,905 A | 5/1924 | Swanick |
| 5,464,479 A | 11/1995 | Kenton et al. |
| 5,507,306 A * | 4/1996 | Irvine et al. ............. 134/166 R |
| 5,679,174 A | 10/1997 | Buongiorno |

\* cited by examiner

*Primary Examiner*—Michael Cleveland
*Assistant Examiner*—Samuel A Waldbaum
(74) *Attorney, Agent, or Firm*—Marjama Muldoon Blasiak & Sullivan LLP

(57) ABSTRACT

An improved method and apparatus for flushing the residue from internal surfaces of cavities in, for example, turbine blades. In accordance with one aspect of the invention, provision is made for simultaneously flushing the internal cavities of a plurality of turbine blades, with each blade having a plurality of cavities therein.

9 Claims, 2 Drawing Sheets

HIGH PRESSURE INTERNAL CLEANING METHOD AND APPARATUS

CROSS REFERENCE TO RELATED APPLICATIONS

This invention relates to U.S. patent application Ser. No. 10/271,681, now U.S. Pat. No. 7,207,997, entitled Apparatus and Method for Cleaning Airfoil Internal Cavities, filed on Oct. 15, 2002, and assigned to the assignee of the present invention and which is incorporated herein by reference.

This is a divisional application of U.S. Ser. No. 10/747,720, filed Dec. 29, 2003, now U.S. Pat. No. 7,406,971, the entirety of which is incorporated herein by reference.

BACKGROUND OF THE INVENTION

This invention relates generally to parts, such as turbine blades, that have internal cavities and, more particularly to a method and apparatus for cleaning the internal cavities thereof.

In the manufacture or repair of turbine blades of the type used in the high pressure turbine of a gas turbine engine, the internal cavities of the blade are left with a residue of undesirable foreign material such as salts, silicone and silk, which must be removed from the internal cavities in order to obtain proper performance therefrom. In addition, the foreign material can collect in corners or other such locations within the internal cavities. The usual method of cleaning these internal surfaces is to conduct an autoclave or ultrasonic cleaning operation, followed by a flushing out of the cavities by the use of a high pressure washing process.

The flushing process is commonly accomplished by using one or more probes to introduce a high pressure flow of a liquid such as water into one or more of the cavities in order to wash out the undesirable residue.

The apparatus for positioning the probes with respect to the blade cavity has generally been of two types. The one that has been used following the autoclave process was that of a single blade being flushed by a pair of probes simultaneously registering with their respective cavities, after which the probes were retracted and then indexed to the next blade for the same process.

Another prior art process that has been used after ultrasonic cleaning is that of a fixture having a pair of extended probes that separately register with individual cavities of two different blades. After the respective cavities have been cleaned, the fixture is retracted and then indexed to adjacent cavities in the same respective blades.

SUMMARY OF THE INVENTION

In accordance with one aspect of the invention, the apparatus for flushing turbine blades has a plurality of probes that are spaced in the plane in which a plurality of spaced blades are held in place such that a plurality of blades can be simultaneously flushed, and the apparatus also includes a plurality of probes in a plane in which the individual cavities of a single blade are disposed such that a plurality of cavities within a single blade can be simultaneously flushed. In this way multiple cavities and multiple blades can be simultaneously flushed in a single process.

In the drawings as hereinafter described, a preferred embodiment is depicted; however various other modifications and alternate constructions can be made thereto without departing from the true spirit and scope of the invention.

DESCRIPTION OF THE PREFERRED EMBODIMENT

Figure 1:
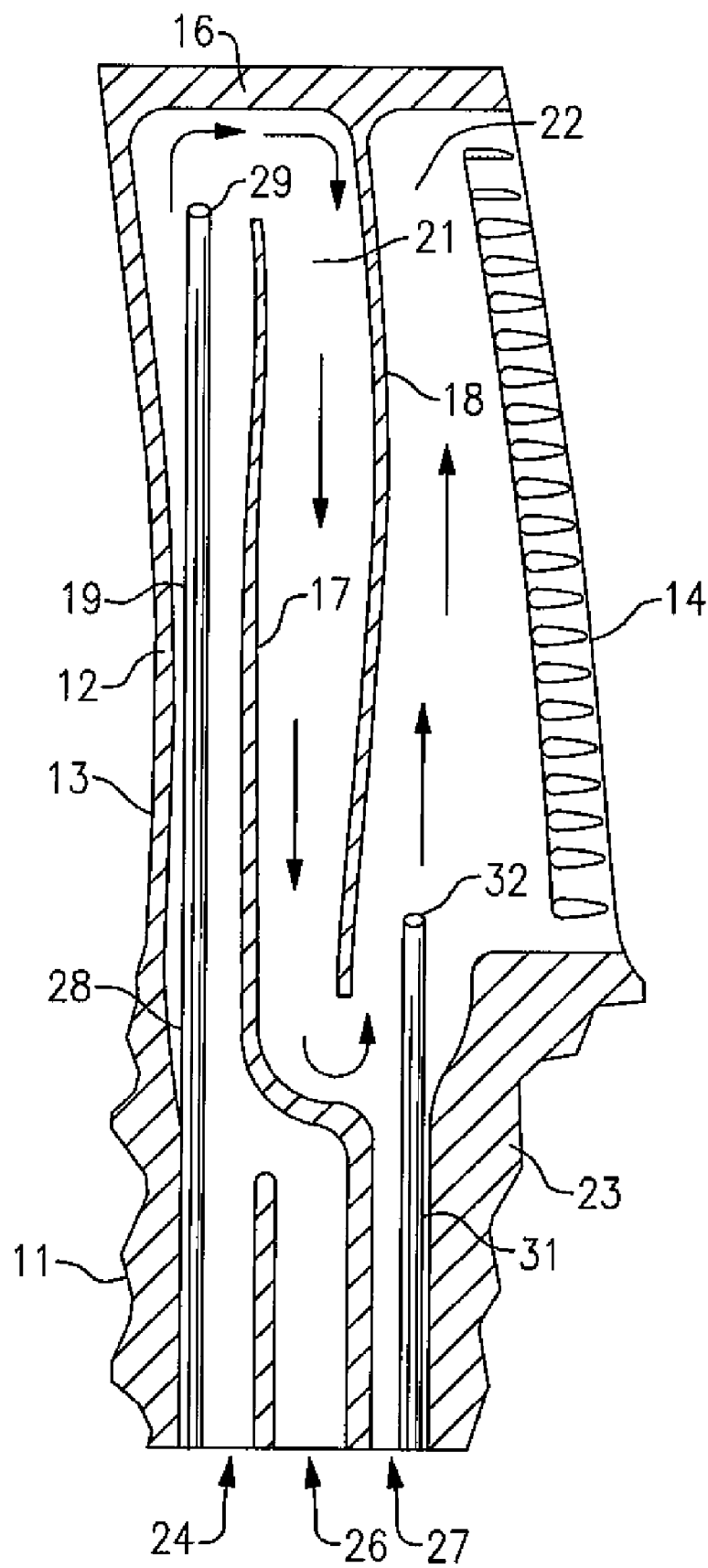
FIG. 1 is a longitudinal cross sectional view of a turbine blade as being flushed in accordance with the present invention.

Referring now to FIG. 1, a turbine blade of the type used in a high pressure turbine of a gas turbine engine is shown to include a root portion 11 at its one end and airfoil portion 12 at its other end. The airfoil portion 12 has a leading edge 13, a trailing edge 14, and a end wall 16 opposite the root portion 11, as well as internal walls 17 and 18 which collectively define the internal cavities 19, 21 and 22 that extend generally longitudinally within the internal structure of the turbine blade.

The root portion 11 includes a plurality of serrations 23 on the outer side thereof to facilitate the attachment to corresponding features on the turbine rotor (not shown), and a plurality of root openings 24, 26 and 27 that lead to the internal cavities 19, 21 and 22. When installed and operating, high pressure air is introduced into the root openings 24, 26 and 27 so as to flow through the cavities 19, 21 and 22 and to exit out the opening in the trailing edge 14 for purposes of cooling the blade.

During the cleaning process in the factory or repair facility, following an autoclave and/or ultrasonic cleaning process, a flushing process is applied to remove various types of undesirable residue from the interior of the blade by the circulation of high pressure fluid, such as water, through the cavities as indicated by the arrows.

As will be seen, a probe 28 is inserted into the cavity 19 to the extent that its end openings 29 is just past the radially outer end of the internal wall 17. A high pressure fluid is then caused to flow through the tubular probe 28 and to be discharged from the end 29 such that it flows against the end wall 16 and back through the cavity 21 as indicated by the arrows.

Similarly, a probe 31 is introduced into the cavity 22 to the extent that it reaches well beyond the radially inner end of the internal wall 18. A high pressure fluid, such as water at a pressure of around 10,000 psi, is caused to flow from the end 32 of the probe 31, along the cavity 22 and out the openings in the trailing edge 14 as shown by the arrows.

Figure 2:
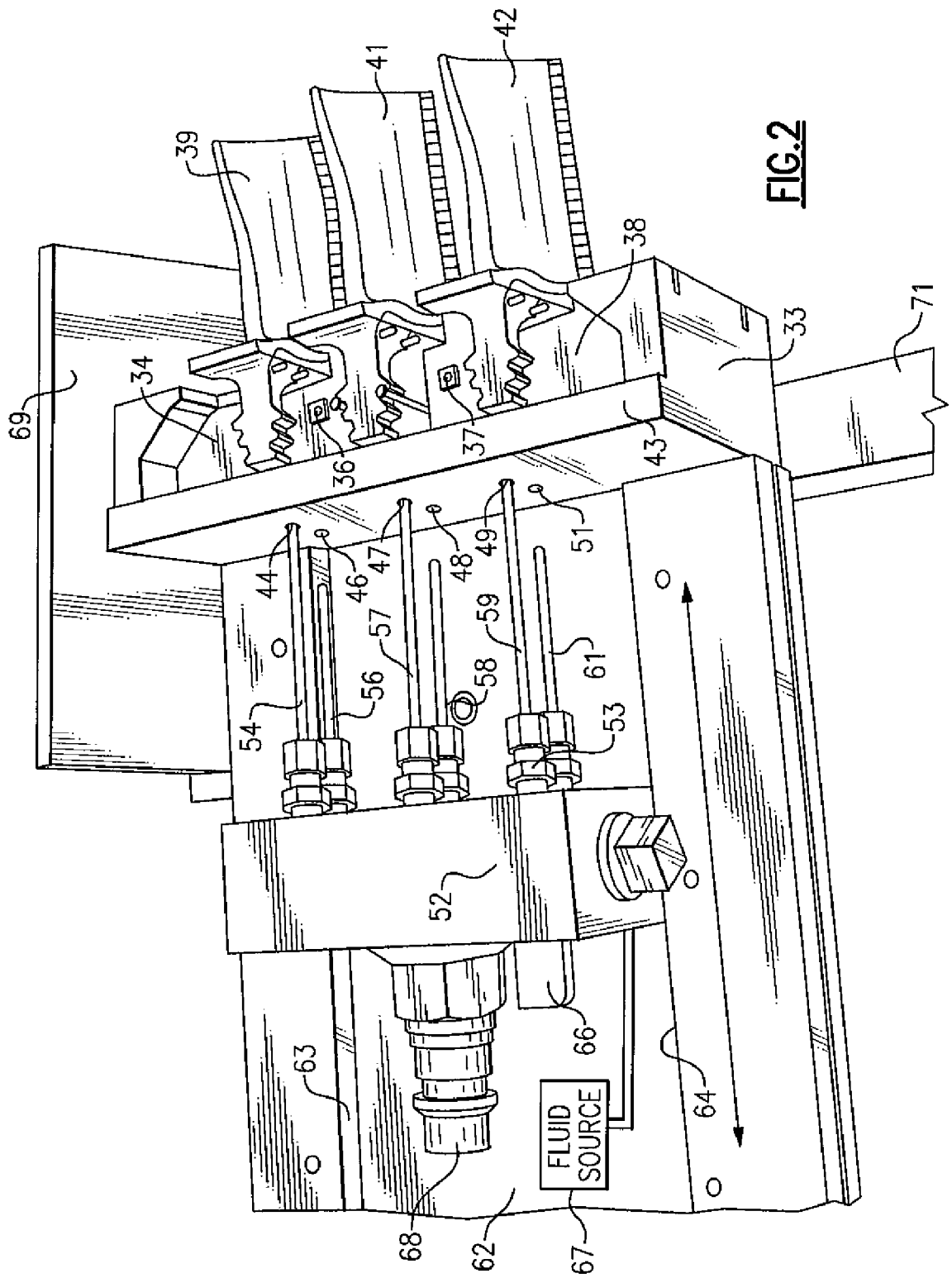
FIG. 2 is a perspective view of an apparatus for simultaneously flushing a plurality of blades in accordance with one embodiment of the present invention.

Reference is now made to FIG. 2 wherein there is shown apparatus for the simultaneous flushing of the internal cavities of a plurality of turbine blades.

A blade holder 33 includes a plurality of spaced chucks 34, 36, 37, and 38 having serrations for receiving the root portion of the blades 39, 41 and 42, therebetween. The blade holder 33 also includes a guide number 43 that is disposed transversely across and near the ends of the roots of the blades 39, 41 and 42. The guide member 43 contains a plurality of passages whose axes are aligned with the root openings of the turbine blades as described hereinabove. That is, passages 44 and 46 have their axes aligned with respective root openings 24 and 27 of blade 39, passages 47 and 48 have axes that are aligned with respective root openings 24 and 27 of blade 41 and passages 49 and 51 have axes that are aligned with root openings 24 and 27 of blade 42.

Disposed opposite the guide member 43 is a manifold 52 which is reciprocally mounted on a base 62 having side guide members 63 and 64 and having a central guide member 66, all of which act to maintain the fixed transverse position of the manifold 52 as it is retracted and advanced along those guide members. Such advancement and retraction may be accomplished by the manual grasping of a handle 68 and moving the manifold forwardly or backwardly on its base 62. Alternatively, a hydraulic mechanism can be attached to the manifold 52 to advance or retract it along its path by the base 62 and its guide members 63,64 and 66.

The manifold 52 is fluidly connected to a high pressure (e.g. 10,000 psi) fluid source such as water or the like. On the front side of the manifold 52 there are a plurality of discharge ports 53 extending outwardly and fluidly connected to respective probes or probe tubes whose axes are aligned with the axes of the respective passages in the guide member 43. That is, probe 54 has its axis aligned with the axis of the passageway 44, probe 56 has its axis aligned with the axis of passage 46, probe 57 has its axis aligned with the axis of passage 47, probe 58 has its axis aligned with the axis of passage 48, probe 59 has its axis aligned with the axis of passage 49, and probe 61 has its axis aligned with the axis of passage 51.

As will be seen in FIG. 2, with each probe pair associated with a single turbine blade, one is longer than the other so as to accommodate the required insertion degrees. The particular probe combinations are unique to a particular turbine blade design. Further, the guide member 43, and most likely the blade holder 33 with its various chucks, are to be used only with a particular design of turbine blade since the positioning of the turbine blade, the passages in the guide member 43 and the length and positioning of the various probes as held by the discharge port members 53, must all be closely coordinated. Thus, for any one of the vertically spaced pairs of probes as shown in FIG. 2, only a single type of blade design may be cleaned with this process. Preferably, each of the three vertically spaced pairs is identical and is adapted for the cleaning of identical blade designs.

Considering now the steps in the process of cleaning a plurality of turbine blades, the manifold 52, is moved to the retracted position with the probes being to the left of the guide member 43. The blade holder 33, with its installed blades, has been moved to a precise position opposite the manifolds 52 with the reference guide surface 69 acting to precisely locate the blade holder 33 on its right side, and with the lower guide surface 71 acting as a reference surface to precisely locate the blade holder 33 in the vertical plane. The manifold 52 and its extended probes are advanced, with the probes passing through the respective passages in the guide member and into their respective cavities of the blades. The fluid source 67 is then activated to force the high pressure flow of water into the cavities for removing any residue from the internal surfaces thereof.

After the cleaning process has been completed the manifold 53 is then retracted, and the blade holder 33 with its attached blades is then lifted from its position and moved to a more remote location so that its cleaned blades can be removed from the holder 33 and other blades are inserted therein such that the holder 33 can then be subsequently placed in position abutting the reference guide surface 69 and the lower guide surface 71 for a repeat of the process.

While the present invention has been particularly shown and described with reference to various embodiments as illustrated in the drawings, it will be understood by one skilled in the art that various changes in detail may be effected therein without departing from the true spirit and scope of the invention as defined by the claims.

I claim:

1. Apparatus for fluidly flushing the internal cavities of a plurality of parts, comprising:
   a fixture for holding a plurality of parts in spaced side-by-side relationship in a first plane, with each part having a plurality of spaced apart cavities aligned in a plane other than said first plane;
   a guide member disposed adjacent said fixture and having a plurality of passages formed therein including adjacent passages that are in a common plane parallel to said first plane and including adjacent passages that are in a common plane other than said first plane and wherein each of said passages is axially aligned in coincidence with one of said part cavities;
   a manifold having a plurality of probe tubes extending therefrom with each of said passages being axially aligned with one of said plurality of probe tubes, said manifold also having a fluid source connected thereto for providing pressurized fluid flow through each of said probe tubes so as to be discharged from the respective ends thereof; and
   means for advancing said manifold toward said guide member such that for each of said passages and cavities there is a probe tube which passes through a respective passage and into a respective cavity for flushing internal surfaces thereof; and
   wherein some of said probe tubes are of different lengths.

2. Apparatus as set forth in claim 1 wherein said first plane is substantially normal to said plane other than said first plane.

3. Apparatus as set forth in claim 1 wherein said guide member is integrally formed with said fixture.

4. Apparatus as set forth in claim 1 wherein, within the same part, the probe tubes being advanced therein are of different lengths.

5. Apparatus as set forth in claim 1 wherein said means for advancing said manifold also includes means for retracting said manifold when the flushing has been completed.

6. Apparatus as set forth in claim 1 and including a means for removing the said fixture and replacing it with another fixture.

7. Apparatus as set forth in claim 6 wherein said removing means is operative to remove said fixture along said first plane.

8. The apparatus as set forth in claim 1, wherein said parts are gas turbine engine parts.

9. The apparatus as set forth in claim 8, wherein said gas turbine engine parts comprise turbine blades.

* * * * *